(12) United States Patent
Medina et al.

(10) Patent No.: US 11,405,928 B2
(45) Date of Patent: Aug. 2, 2022

(54) DEVICES AND METHODS FOR MULTI-ANTENNA SIDELINK SCHEDULING

(71) Applicant: Huawei Technologies Duesseldorf GmbH, Duesseldorf (DE)

(72) Inventors: Daniel Medina, Munich (DE); Konstantinos Manolakis, Munich (DE); Samer Bazzi, Munich (DE); Serkan Ayaz, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/992,807

(22) Filed: Aug. 13, 2020

(65) Prior Publication Data

US 2020/0374891 A1    Nov. 26, 2020

Related U.S. Application Data

(63) Continuation of application No. PCT/EP2018/053565, filed on Feb. 13, 2018.

(51) Int. Cl.
*H04W 24/10* (2009.01)
*H04W 72/08* (2009.01)

(52) U.S. Cl.
CPC ......... *H04W 72/082* (2013.01); *H04W 24/10* (2013.01)

(58) Field of Classification Search
CPC .. H04W 72/082; H04W 24/10; H04W 72/048
See application file for complete search history.

(56) References Cited

U.S. PATENT DOCUMENTS

2018/0115873 A1*  4/2018  Aminaka ............... H04W 92/18
2019/0159174 A1*  5/2019  Seo ........................ H04W 76/14

FOREIGN PATENT DOCUMENTS

| GB | 2500392 A | 9/2013 |
| WO | 2012162788 A1 | 12/2012 |
| WO | 2017218782 A1 | 12/2017 |

OTHER PUBLICATIONS

"3rd Generation Partnership Project; Technical Specification Group Services and System Aspects; Proximity-based services (ProSe); Stage 2 (Release 14)," 3GPP TS 23.303 V14.1.0, pp. 1-124, 3rd Generation Partnership Project, Valbonne, France (Dec. 2016).

(Continued)

*Primary Examiner* — Chuong A Ngo
(74) *Attorney, Agent, or Firm* — Leydig, Voit & Mayer, Ltd.

(57) ABSTRACT

The invention relates to a sidelink communication device that includes a transceiver and a processor. The transceiver includes a plurality of antennas and is configured to communicate, using one or more of the plurality of antennas, with at least one neighboring sidelink communication device using one or more sidelink radio resources of a plurality of sidelink radio resources allocated by a network entity. The processor is configured to determine a measure of the ability of the sidelink communication device to suppress interference to and/or from at least one other neighboring sidelink communication device using one or more of the plurality of antennas. The transceiver is further configured to transmit, to the network entity, information about the measure for the ability of the sidelink communication device to suppress the interference for allocation of the one or more sidelink radio resources by the network entity.

20 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, pp. 1-330, 3rd Generation Partnership Project, Valbonne, France (Mar. 2017).

* cited by examiner

DEVICES AND METHODS FOR MULTI-ANTENNA SIDELINK SCHEDULING

CROSS-REFERENCE TO RELATED APPLICATIONS

This application is a continuation of International Application No. PCT/EP2018/053565, filed on Feb. 13, 2018, the disclosure of which is hereby incorporated by reference in its entirety.

STATEMENT REGARDING FUNDING

The research leading to the developments disclosed in this application has received funding from the European Union's Horizon 2020 research and innovation program under grant agreement No 761510.

TECHNICAL FIELD

In general, the present invention relates to the field of wireless communication. More specifically, the present invention relates to devices and methods for multi-antenna sidelink scheduling in a vehicle-to-everything (V2X) communication network, in particular a sidelink communication device and a network entity for allocating sidelink radio resources as well as corresponding methods.

BACKGROUND

Vehicle-to-Everything (V2X) services can be provided directly, via a so-called PC5 interface (also known as sidelink, or device-to-device (D2D) communication), and/or indirectly, via an LTE-Uu interface (also known as uplink/downlink), as specified in 3GPP TS 36.300 V14.2.0, "LTE; Evolved Universal Terrestrial Radio Access (E-UTRA) and Evolved Universal Terrestrial Radio Access Network (E-UTRAN); Overall description; Stage 2." Support of V2X services via the PC5 interface is provided by V2X sidelink communication, which is a communication mode in which User Equipments (UEs) such as vehicles can communicate with each other directly via the PC5 interface. This communication mode is supported when the UE is served by E-UTRAN and when the UE is outside of E-UTRA coverage.

A UE supporting V2X sidelink communication can operate in two modes for sidelink radio resource allocation: in a first mode, known as scheduled resource allocation, a UE requests radio resources from a base station, and the base station allocates dedicated radio resources to the UE. In a second mode, known as autonomous resource selection, the UE on its own selects radio resources from (pre)configured resource pools.

In the scheduled resource allocation mode, the UEs report their locations to the base station. Having no sidelink channel knowledge, the sidelink scheduler (e.g., a base station) is forced to allocate orthogonal resources (in time and/or frequency) to nearby UEs, in order to prevent mutual interference.

However, transmissions from nearby UEs may not need to be orthogonalized by the sidelink scheduler if the UEs have multiple antennas. In other words, a radio resource can be reused by nearby transmissions if the UEs can make use of multi-antenna transmission techniques to mitigate interference.

In light of the above, there is a need for improved devices and methods for multi-antenna sidelink communication, allowing for more spectrally efficient scheduling of sidelink transmissions.

SUMMARY

The present disclosure describes improved devices and methods for multi-antenna sidelink communication, allowing for more spectrally efficient scheduling of sidelink transmissions.

Generally, embodiments of the disclosure relate to a multi-antenna sidelink communication device, such as a User Equipment (UE), and a network entity, such as a base station, as well as corresponding methods for reusing sidelink radio resources and thus transmitting data efficiently and cost-effectively. More specifically, embodiments can increase sidelink radio resource reuse by allowing the sidelink scheduler (e.g., a base station) to receive information about a measure for the ability of a UE to mitigate interference to/from nearby UEs by means of multi-antenna transmission/reception.

The embodiments provide a key advantage by allowing for a significant increase in sidelink radio resource reuse at low cost in terms of control signaling overhead (reporting to the base station of UE's ability to suppress interference to/from nearby UEs), compared to the overhead that would be incurred if full Channel State Information (CSI) were reported.

More specifically, according to a first aspect, the disclosure relates to a sidelink communication device (i) which comprises: a transceiver comprising a plurality of antennas and configured to communicate using one or more of the plurality of antennas with at least one neighboring sidelink communication device (j) using one or more sidelink radio resources of a plurality of sidelink radio resources allocated by a network entity, in particular a base station; and a processor configured to determine a measure for the ability of the sidelink communication device (i) to suppress interference to and/or from at least one other neighboring sidelink communication device (k) using one or more of the plurality of antennas; wherein the transceiver is further configured to transmit to the network entity information about the measure for the ability of the sidelink communication device (i) to suppress interference to and/or from the at least one other neighboring sidelink communication device (k), in particular for allocation of the one or more sidelink radio resources by the network entity.

Thus, an improved sidelink communication device is provided, allowing for more spectrally efficient scheduling of sidelink transmissions.

In an implementation form, the measure for the ability to suppress interference corresponds to a set of one or more neighboring sidelink communication devices toward which the sidelink communication device (i) can form a "null" (e.g., in its radiation pattern) when transmitting to and/or receiving from the sidelink communication device (j). This set of one or more neighboring sidelink communication devices is referred to herein as a "nulling set".

In a further possible implementation form of the first aspect, the measure for the ability to suppress interference to and/or from the at least one other neighboring sidelink communication device (k) is determined on the basis of one or more sidelink reference signals exchanged between the sidelink communication device (i) and the at least one other neighboring sidelink communication device (k).

In a further possible implementation form of the first aspect, the transceiver is further configured to transmit to the network entity information about an identity, a signal strength and/or a location of the at least one other neighboring sidelink communication device (k).

In a further possible implementation form of the first aspect, the transceiver is further configured to receive from the network entity information about the one or more sidelink reference signals and/or information about one or more sidelink radio resources for exchanging the one or more sidelink reference signals with the at least one other neighboring sidelink communication device (k).

In a further possible implementation form of the first aspect, the transceiver is further configured to transmit to or receive from the at least one other neighboring sidelink communication device (k) the one or more sidelink reference signals on the basis of the information received from the network entity.

In a further possible implementation form of the first aspect, the processor is configured to determine, on the basis of the one or more sidelink reference signals exchanged between the sidelink communication device (i) and the at least one other neighboring sidelink communication device (k), one or more physical properties of the sidelink communication channel between at least one of the plurality of antennas of the sidelink communication device (i) and at least one of a plurality of antennas of the at least one other neighboring sidelink communication device (k). The processor is further configured to determine the measure for the ability of the sidelink communication device (i) to suppress interference to and/or from the at least one other neighboring sidelink communication device (k) on the basis of the one or more physical properties of the sidelink communication channel, in particular by means of signal processing of one or more signals from the plurality of antennas of the sidelink communication device (i).

In a further possible implementation form of the first aspect, the transceiver is further configured to receive from the network entity radio resource allocation information specifying one or more of the plurality of sidelink radio resources allocated by the network entity for communicating with the at least one neighboring sidelink communication device (j), on the basis of the information about the measure for the ability of the sidelink communication device (i) to suppress interference to and/or from the at least one other neighboring sidelink communication device (k).

According to a second aspect, the disclosure relates to a method for operating a sidelink communication device (i) configured to communicate with at least one neighboring sidelink communication device (j). The method comprises the following steps: determining, in particular on the basis of one or more sidelink reference signals exchanged between the sidelink communication device (i) and at least one other neighboring sidelink communication device (k), a measure for the ability of the sidelink communication device (i) to suppress interference to and/or from the at least one other neighboring sidelink communication device (k) using one or more of a plurality of antennas of the sidelink communication device (i); transmitting to a network entity, in particular a base station, information about the measure for the ability of the sidelink communication device (i) to suppress interference to and/or from the at least one other neighboring sidelink communication device (k); and communicating using one or more of the plurality of antennas with the at least one neighboring sidelink communication device (j) using one or more sidelink radio resources of a plurality of sidelink radio resources allocated by the network entity.

Thus, an improved method is provided, allowing for more spectrally efficient scheduling of sidelink transmissions.

According to a third aspect, the disclosure relates to a network entity, in particular a base station, for allocating sidelink radio resources for sidelink communication between a sidelink communication device (i) and at least one neighboring sidelink communication device (j), wherein the network entity comprises: a transceiver configured to receive information about a measure for the ability of the sidelink communication device (i) to suppress interference to and/or from at least one other neighboring sidelink communication device (k) using one or more of a plurality of antennas of the sidelink communication device (i); and a processor configured to allocate one or more of a plurality of sidelink radio resources to the sidelink communication device (i) for communication with the at least one neighboring sidelink communication device (j) on the basis of the information about the measure for the ability of the sidelink communication device (i) to suppress interference to and/or from the at least one other neighboring sidelink communication device (k).

Thus, an improved network entity for allocating radio resources to a sidelink communication device is provided.

In a further possible implementation form of the third aspect, the transceiver is further configured to receive information about an identity, a signal strength and/or a location of the at least one other neighboring sidelink communication device (k).

In a further possible implementation form of the third aspect, the processor is further configured to determine one or more sidelink reference signals and/or allocate one or more sidelink radio resources for exchanging the one or more sidelink reference signals on the basis of the identity, the signal strength and/or the location of the at least one other neighboring sidelink communication device (k). The transceiver is further configured to transmit to the sidelink communication device (i) information about the one or more sidelink reference signals and/or information about the one or more sidelink radio resources for exchanging the one or more sidelink reference signals with the at least one other neighboring sidelink communication device (k).

In a further possible implementation form of the third aspect, the transceiver is further configured to transmit sidelink radio resource allocation information to the sidelink communication device (i), wherein the radio resource allocation information identifies the one or more of the plurality of sidelink radio resources allocated to the sidelink communication device (i).

According to a fourth aspect, the disclosure relates to a method for allocating sidelink radio resources for sidelink communication between a sidelink communication device (i) and at least one neighboring sidelink communication device (j). The method comprises the following steps: receiving information about a measure for the ability of the sidelink communication device (i) to suppress interference to and/or from at least one other neighboring sidelink communication device (k) using one or more of a plurality of antennas of the sidelink communication device (i); and allocating one or more of a plurality of sidelink radio resources to the sidelink communication device (i) for communication with the at least one neighboring sidelink communication device (j) on the basis of the information about the measure for the ability of the sidelink communication device (i) to suppress interference to and/or from the at least one other neighboring sidelink communication device (k).

Thus, an improved method for allocating radio resources to a sidelink communication device is provided.

According to a fifth aspect, the disclosure relates to a computer program comprising program code for performing the method of the second or fourth aspect when executed on a computer.

Embodiments and implementation forms of various aspects of the disclosure can be implemented in hardware and/or software.

BRIEF DESCRIPTION OF THE DRAWINGS

Further embodiments will be described with respect to the following figures, wherein.

Figure 1:
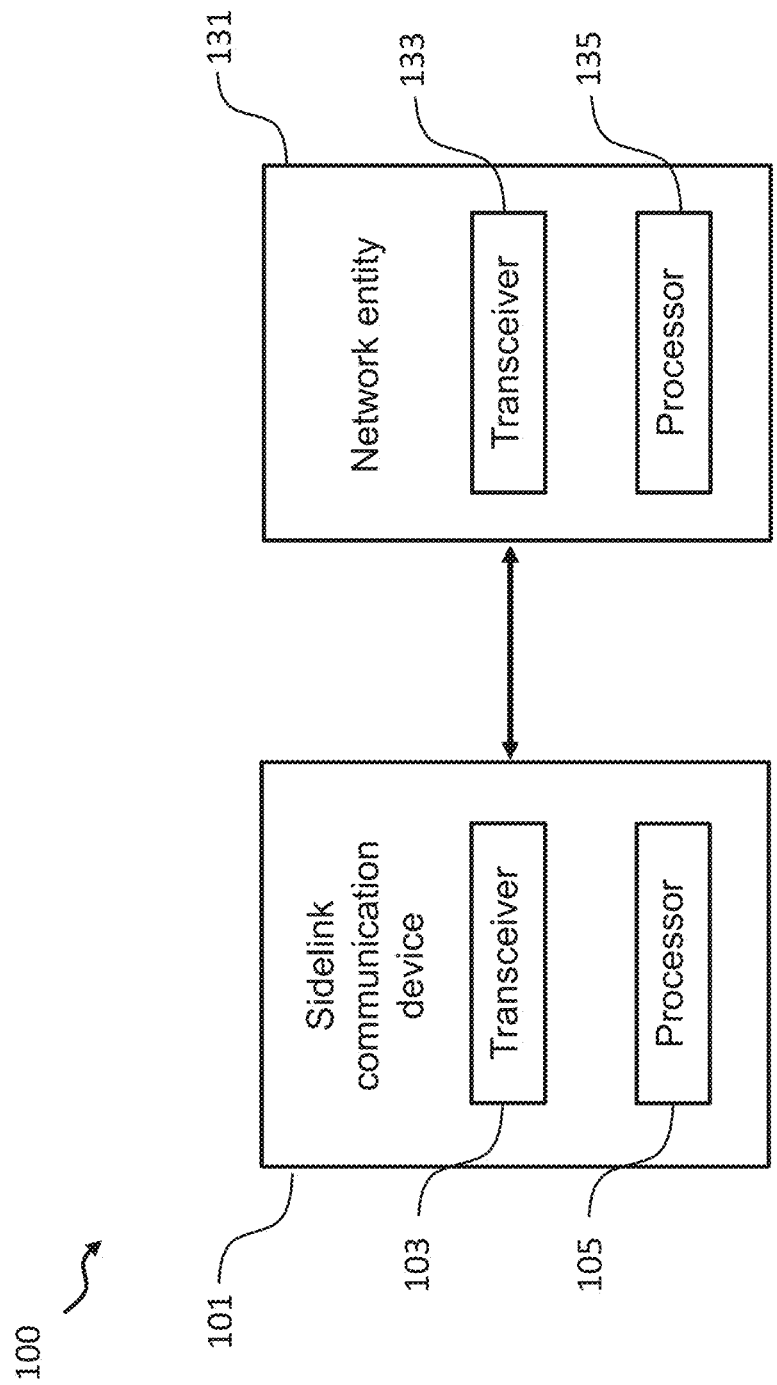
FIG. 1 shows a schematic diagram illustrating a sidelink communication device according to an embodiment in communication with a network entity according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with different functional blocks or processing units are described, which are connected with each other or exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

As will be described in more detail in the following, embodiments relate to a V2X communication network comprising a sidelink communication device and a network entity, which allow for a significant increase in sidelink radio resource reuse.

Multi-antenna transmission techniques, such as beamforming or Multiple-Input Multiple-Output (MIMO), are powerful tools for interference mitigation and Signal-to-Interference-plus-Noise Ratio (SINR) enhancement. The potential of MIMO processing (e.g., through data precoding and/or postcoding) scales with the number of available antennas: compared to single-antenna transmission, SINR gains of above 20 dB can be achieved by using, e.g., up to 16 transmitting and receiving antennas. Furthermore, depending on the particular precoding and/or postcoding scheme, available antennas can be used for interference mitigation, diversity and/or data multiplexing gains.

The embodiments can combine beamforming and/or MIMO schemes with sidelink scheduling decisions taken by a network entity in the form of a sidelink scheduler: given two (or more) sidelink communication devices for data transmission, e.g., User Equipments (UEs), a sidelink scheduler such as a base station can determine whether the same radio resource (i.e., time and/or frequency channel) may be used by both UEs. Instead of reporting the full Channel State Information (CSI) to the base station, which would incur considerable control signaling overhead, the UEs can report information about their ability to use multi-antenna transmission/reception to cancel interference to/from nearby UEs, as will be described in more detail in the following.

FIG. 1 shows a schematic diagram illustrating a communication network 100 comprising a sidelink communication device (i) 101, in particular a multi-antenna sidelink communication device, according to an embodiment, and a network entity 131, according to an embodiment. The sidelink communication device (i) 101 is configured to communicate with neighboring sidelink communication devices (not shown in FIG. 1) via a sidelink communication channel, and with the network entity 131 via an uplink/downlink communication channel.

In the embodiment shown in FIG. 1, the sidelink communication device (i) 101 could be implemented in the form of a user entity such as a mobile phone or a vehicle or a communication module of a vehicle. However, it will be appreciated that embodiments of the invention apply to sidelink communication devices other than mobile phones or vehicles as well. In an exemplary embodiment, the network entity 131 can be, for instance, a base station.

As illustrated in FIG. 1, the sidelink communication device (i) 101 comprises a transceiver 103 comprising a plurality of antennas and configured to communicate with at least one neighboring sidelink communication device (j) using one or more sidelink radio resources of a plurality of sidelink radio resources allocated by the network entity 131.

Furthermore, the sidelink communication device (i) 101 comprises a processor 105. As will be described in more detail in the context of FIG. 2, the processor 105 is configured to determine a measure for the ability of the sidelink communication device (i) 101 to suppress interference to and/or from at least one other neighboring sidelink communication device (k) using one or more of the plurality of antennas.

As can be taken from FIG. 1, the network entity 131 comprises a transceiver 133 configured to receive information about the measure for the ability of the sidelink communication device (i) 101 to suppress interference to and/or from at least one other neighboring sidelink communication device (k) using one or more of a plurality of antennas of the sidelink communication device (i) 101.

The network entity 131 further comprises a processor 135 configured to allocate one or more of a plurality of sidelink radio resources to the sidelink communication device (i) 101 for communication with the at least one neighboring sidelink communication device (j) on the basis of the information about the measure for the ability of the sidelink communication device (i) 101 to suppress interference to and/or from the at least one other neighboring sidelink communication device (k).

More details about sidelink radio resource allocation for sidelink communication between the sidelink communication device (i) 101 and at least one neighboring sidelink communication device (j) will be described in the following.

First, the transceiver 133 of the network entity 131 is configured to receive information about an identity, a signal strength and/or a location of the at least one other neighboring sidelink communication device (k) from the sidelink communication device (i) 101.

After the reception, the processor 135 of the network entity 131 is configured to determine one or more sidelink reference signals and/or allocate one or more sidelink radio resources for exchanging the one or more sidelink reference signals on the basis of the identity, the signal strength and/or the location of the at least one other neighboring sidelink communication device (k), and the transceiver 133 is further configured to transmit to the sidelink communication device (i) 101 information about the one or more sidelink reference signals and/or information about the one or more sidelink radio resources for exchanging the one or more sidelink reference signals with the at least one other neighboring sidelink communication device (k).

The transceiver 103 of the sidelink communication device 101 is configured to receive from the network entity 131 information about the one or more sidelink reference signals and/or information about one or more sidelink radio resources for exchanging the one or more sidelink reference signals with the at least one other neighboring sidelink communication device (k). More details about the reference signal assignment will be further discussed in the following embodiments.

Furthermore, the transceiver 103 of the sidelink communication device 101 is configured to transmit the one or more sidelink reference signals on the basis of the information received from the network entity 131 to the at least one other neighboring sidelink communication device (k). The transceiver 103 is also configured to receive the one or more sidelink reference signals from the at least one other neighboring sidelink communication device (k).

On the basis of the one or more sidelink reference signals exchanged with the at least one other neighboring sidelink communication device (k), the processor 105 of the sidelink communication device (i) 101 can determine one or more physical properties of the sidelink communication channel between at least one of the plurality of antennas of the sidelink communication device (i) 101 and at least one of a plurality of antennas of the at least one other neighboring sidelink communication device (k).

As already mentioned above, the processor 105 is configured to determine a measure for the ability of the sidelink communication device (i) 101 to suppress interference to and/or from the at least one other neighboring sidelink communication device (k) on the basis of the one or more physical properties of the sidelink communication channel, in particular by means of signal processing of one or more signals from the plurality of antennas of the sidelink communication device (i) 101.

After the above determination by the processor 105, the transceiver 103 of the sidelink communication device (i) 101 can transmit to the network entity 131 information about the measure for the ability of the sidelink communication device (i) 101 to suppress interference, in particular for allocation of the one or more sidelink radio resources by the network entity 131.

Upon receiving the information, the network entity 131 can allocate one or more of the plurality of sidelink radio resources to the sidelink communication device (i) 101 for communication with the at least one neighboring sidelink communication device (j) on the basis of the information about the measure for the ability of the sidelink communication device (i) 101 to suppress interference to and/or from the at least one other neighboring sidelink communication device (k).

As already mentioned, the sidelink communication device (i) 101 can determine a measure for its ability to suppress interference to and/or from at least one other neighboring sidelink communication device (k) using one or more of the plurality of antennas and then transmit this measure to the network entity 131 for the purpose of sidelink radio resource allocation. As will be illustrated under further reference to FIG. 2, the measure for the ability to suppress interference can correspond to a set of one or more neighboring sidelink communication devices toward which the sidelink communication device (i) 101 can form "nulls" (e.g., in its radiation pattern) when transmitting to and/or receiving from the sidelink communication device (j). This set of one or more neighboring sidelink communication devices is referred to herein as a "nulling set".

More specifically, in an embodiment, the sidelink communication device (i) 101 (herein also referred to as user equipment or UE) can inform the network entity 131 (herein also referred to as base station) about a set of one or more nearby UEs (m) 205a-d toward which it can form nulls when transmitting to a UE (j) 203. Such a set is referred to as transmit nulling set $Z_{ij}^T$.

Figure 2:
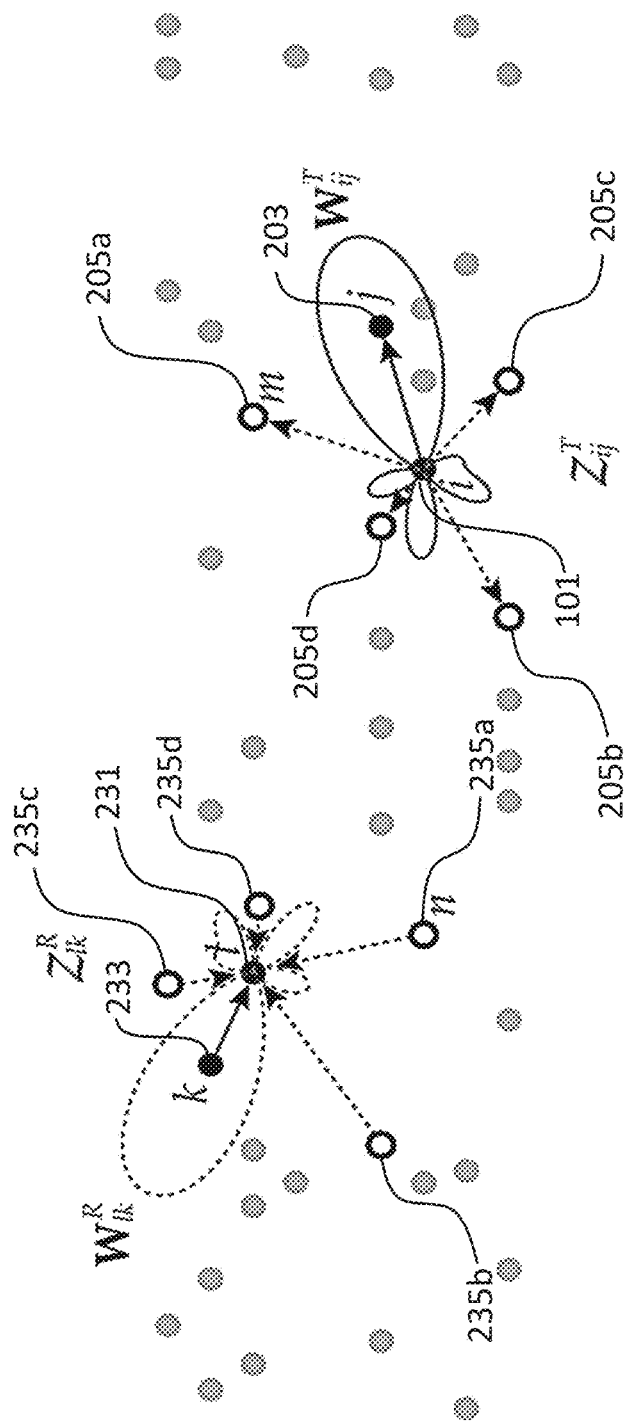
FIG. 2 shows a schematic diagram illustrating a transmit nulling set and a receive nulling set formed by a sidelink communication device according to an embodiment.

Similarly, a sidelink communication device or a UE (l) 231 can inform the network entity 131, i.e., the base station, about a set of one or more nearby UEs (n) 235a-d toward which it can form nulls when receiving from a UE (k) 233. Such a set is referred to as receive nulling set $Z_{lk}^R$. The formation of the transmit nulling set $Z_{ij}^T$ and receive nulling set $Z_{lk}^R$ are illustrated in FIG. 2.

In general, the sets $Z_{ij}^T$ and $Z_{ij}^R$ may or may not be identical. In analogy to uplink/downlink non-symmetries, the beamforming/MIMO capabilities of sidelink transmission can be different from those of sidelink reception, e.g., if a different number of antennas and/or precoding/postcoding schemes are available. In this case, both transmit and receive nulling sets can be reported. In the following, however, the same notation $Z_{ij}$ is used for simplicity, covering both cases. Thus, $Z_{ij}$ denotes the set of UEs toward which the UE (i) 101 can form nulls when transmitting/receiving to/from UE (j) 203.

To minimize interference, the base station 131, acting as sidelink scheduler, can ensure sufficient physical separation between UEs transmitting/receiving on any given radio resource. Thus, upon receiving a request for resources from UE (i) 101 to transmit to UE (j) 203 on link (i,j), the base station 131 may consider a set of candidate resources, wherein each candidate resource fulfills the following requirements: the UE (i) 101 is sufficiently far away from all UEs (l) 231 scheduled to receive on the given radio resource; the UE (j) 203 is sufficiently far away from all UEs (k) 233 scheduled to transmit on the given radio resource.

In such case, however, the base station 131 does not take advantage of the ability of the UEs to mitigate interference by means of multi-antenna transmission/reception, which may thus result in a small set of candidate resources, especially when the network is under high load.

On the other hand, if the sidelink scheduler (i.e., base station) 131 is aware of the nulling sets $Z_{ij}$ for each link (i,j), or a subset thereof, the base station 131 may relax the above constraints by considering as candidate resources those resources that fulfill the following requirements: the UE (i) 101 is sufficiently far away from all UEs (l) 231 scheduled to receive on the given radio resource, excluding those toward which it can form nulls, i.e., $l \in Z_{ij}$, as well as those which can form nulls toward UE (i) 101, i.e., $i \in Z_{lk}$; the UE (j) 203 is sufficiently far away from all UEs (k) 233 scheduled to transmit on the given radio resource, excluding those toward which it can form nulls, i.e., $k \in Z_{ji}$, as well as those which can form nulls toward UE (j) 203, i.e., $j \in Z_{kl}$.

As shown in FIG. 2, the UE (i) 101 can form a null toward the UE (m) 205a when transmitting to the UE (j) 203, i.e., $m \in Z_{ij}$. Thus, in spite of the UE (i) 101 being physically close to the UE (m) 205a, the UE (i) 101 may be allowed to transmit on a resource on which the UE (m) 205a is receiving, without causing interference to the UE (m) 205a.

Similarly, the UE (l) 231 can form a null toward the UE (n) 235a when receiving from the UE (k) 233, i.e., $n \in Z_{lk}$. Thus, in spite of the UE (l) 231 being physically close to the UE (n) 235a, the UE (l) 231 may be allowed to receive on a resource on which the UE (n) 235a is transmitting, without suffering interference from the UE (n) 235a.

Figure 3:
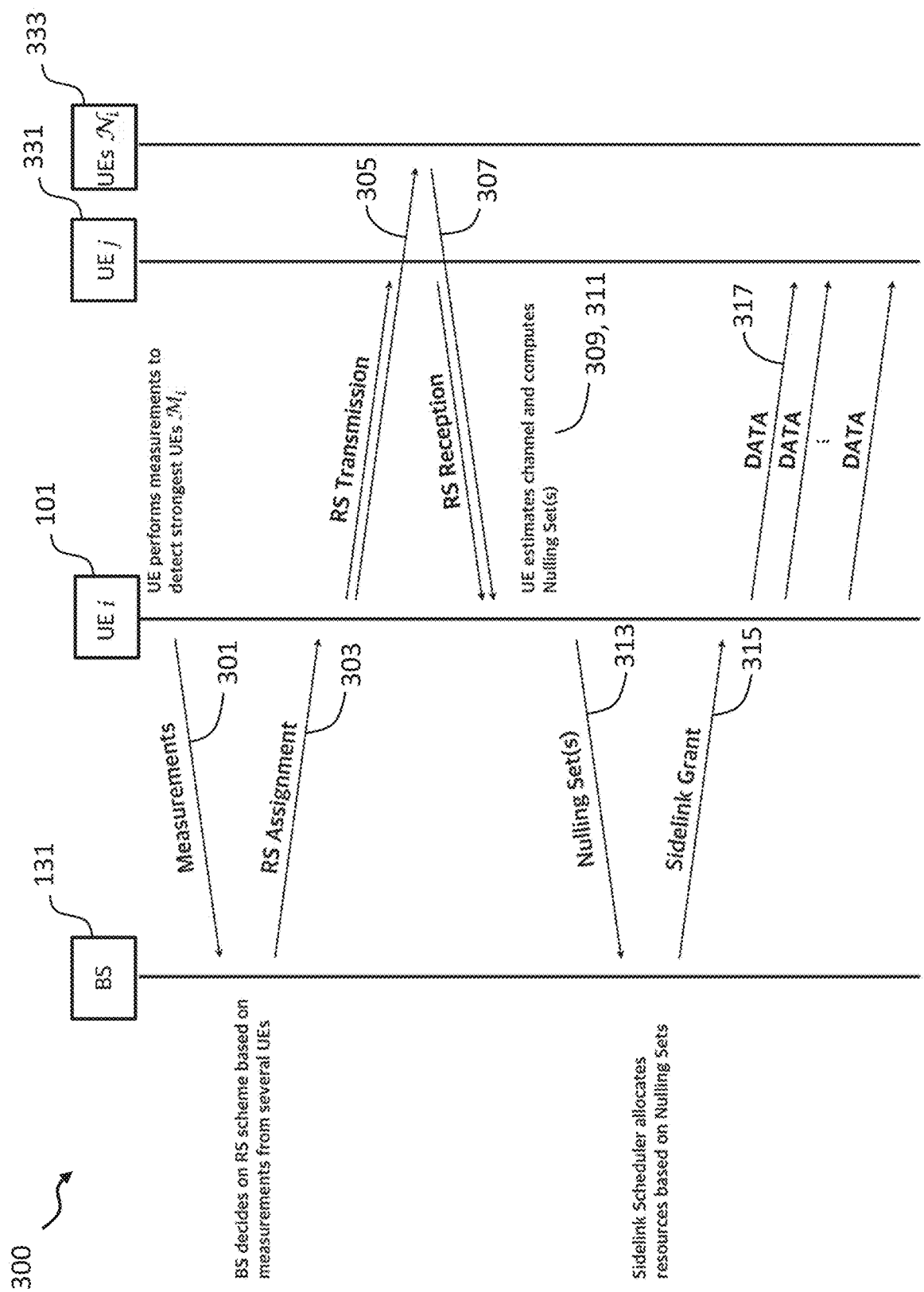
FIG. 3 shows a schematic diagram summarizing a procedure for allocating sidelink radio resources according to an embodiment.

FIG. 3 shows a schematic diagram summarizing a procedure 300 for allocating sidelink radio resources according to an embodiment. The procedure 300 shown in FIG. 3 comprises the following steps.

In a first step 301 of measurement reporting, based on own measurements, the UE (i) 101 reports a list of neighbor (i.e., strongest detected) UEs ($M_i$) to its serving base station 131. Together with the IDs of the UEs, location information and signal strengths observed from these UEs can also be reported if available at the UE (i) 101.

In a second step 303 of reference signal (RS) assignment, the UE (i) 101 receives instructions from the base station 131 about the RS scheme to use, which includes RS symbols and their allocation in time, frequency, beam and/or antenna.

In a third step 305, 307 of RS transmission and/or reception, the UE (i) 101 transmits or receives RSs based on the assigned RS scheme.

In a fourth step 309 of channel estimation, the UE (i) 101 can estimate the MIMO channel matrix $H_{ij}$ to UE (j) 331, as well as the MIMO channel matrix $H_{im}$ to each UE (m) of a subset ($N_i$) 333 of active neighbor UEs ($m \in N_i \subseteq M_i$), based on the RS sequences received from UE (j) 331, and the RS sequences received from each UE (m) of the subset ($N_i$) 333 of active neighbor UEs. If the UEs support beamforming, this phase also includes the selection of the best set of beams.

In a fifth step 311 of nulling set determination, based on these measurements and—if provided—knowledge of locations of the UEs, the UE (i) 101 determines a nulling set $Z_{ij}$ for UE (j) 331, as well as a nulling set $Z_{im}$ for each UE (m) of the subset ($N_i$) 333 of active neighbor UEs. This can be implemented via beamforming and/or MIMO precoding/postcoding in both transmitting and/or receiving direction by the UE (i) 101.

In a sixth step 313 of nulling set reporting, the UE (i) 101 reports its nulling sets ($Z_{ij}$ and $Z_{im}$, $m \in N_i$) to its serving base station 131. This information includes the user IDs, time, frequency and spatial resources to which interference mitigation applies and may also include information about the expected interference level (including beamforming and/or precoding/postcoding), channel measurements (complex-valued or power levels), etc. In case UEs are served by different base stations, this information needs to be exchanged between the base stations (e.g., over the backhaul network).

In a seventh step 315 of sidelink resource allocation, the sidelink scheduler, i.e., the base station 131, uses the reported nulling sets when determining candidate resources for link scheduling. The scheduling decision is transmitted to the UE (i) 101 via a sidelink grant.

In a final step 317 of sidelink data transmission, the UE (i) 101 transmits the sidelink data to the UE (j) 331 using beamforming/MIMO processing. In the general case of transmit and receive side beamforming and MIMO processing, the MIMO signal ($y_j$) received by the UE (j) 331, which has been scheduled to receive a data symbol/vector ($s_{ij}$) from the UE (i) 101 on a particular radio resource, will be given by $$y_j = W_{ji}^R(H_{ij}W_{ij}^T s_{ij} + \Sigma_{k \neq i}\Sigma_{l \neq j} H_{kj} W_{kl}^T s_{kl} + \Sigma_{m \neq j} H_{ij} W_{im}^T s_{im} + z_j + n_j)$$

wherein $W_{ji}^R$ denotes the beamforming/postcoding matrix (digital, analog, or hybrid) used by the UE (j) 331 to receive data from the UE (i) 101; $H_{ij}$ denotes the MIMO channel matrix between the UE (i) 101 and the UE (j) 331 (including small- and large-scale fading, as well as the antenna gains on transmit and receive side); $W_{ij}^T$ denotes the beamforming/precoding matrix (digital, analog, or hybrid) used by the UE (i) 101 to transmit data to the UE (j) 331; $z_j$ denotes the out-of-cluster interference at the UE (j) 331; and $n_j$ denotes thermal noise at the UE (j) 331.

The first term inside the brackets is the desired signal, the second term represents interference from other transmitters (k), and the third term represents interference caused by transmissions from the UE (i) 101 to other UEs (m). By performing beamforming/MIMO processing, the interference (second and third terms) can be mitigated.

The procedure shown in FIG. 3 is described from the perspective of the UE (i) 101, meaning that this is the UE measuring and reporting information to the network entity 131 and receiving instructions from the network entity 131 for transmission to another UE (j) 331. The same procedure of measurement reporting is followed by the UE (j) 331 and other UEs as well, so that RS assignments and sidelink grants are assigned by the network entity 131 on the basis of the information provided by all involved UEs.

In order for the UE (i) 101 to be informed about the RS schemes used by its nearby UEs (i.e., the channels it needs to estimate), the instructions of the network entity 131 can be provided in the following form according to an embodiment: "RS group index", determining the group (family) of RS sets to which the UE (i) 101 and its own RS scheme belongs; and/or "RS user index", defining the particular RS scheme of the UE (i) 101 within the group.

Based on these two indices, the UE (i) 101 has full information about its own RS scheme, as well as the RS schemes of neighbor UEs, whose channel it needs to estimate. These are implicitly given by the remaining user indices of the RS schemes defined by the group index.

Not all RS user indices need to be used by all neighbor UEs at all times. The subset of active neighbor UEs (corresponding to the channels to be detected by the UE) is denoted by $N_i$ ($N_i \subseteq M_i$).

Naturally, the number (and exact IDs) of the UEs which will form the beamforming/MIMO transmission or reception group is not known before or during channel estimation. Therefore, the RS index must include a sufficiently large number of different RS schemes, allowing for the estimation of a sufficiently large number of channels to different UEs. Out of these UEs, the particular UEs which will be included into the final beamforming/MIMO transmission or reception group will be selected.

In order to avoid interference on RS symbols, the same RS group index should be used only in sufficiently separated geographical areas. However, the areas in which different RS group indices are simultaneously used can be under certain conditions also overlapping. This implies that RSs defined by (some of the) RS group indices may coexist, e.g., if they are separated in time, frequency, beam, antenna or code.

The UE can use the instructed RS scheme until it receives a new instruction by the base station. The decision updates of the base station are based on measurements ($M_i$) and location information provided by the UE and all other UEs to the base station.

In order to allow for channel estimation between UEs served by different base stations (cell edge), RS assignments can be jointly agreed by base stations before being provided to UEs.

Figure 4:
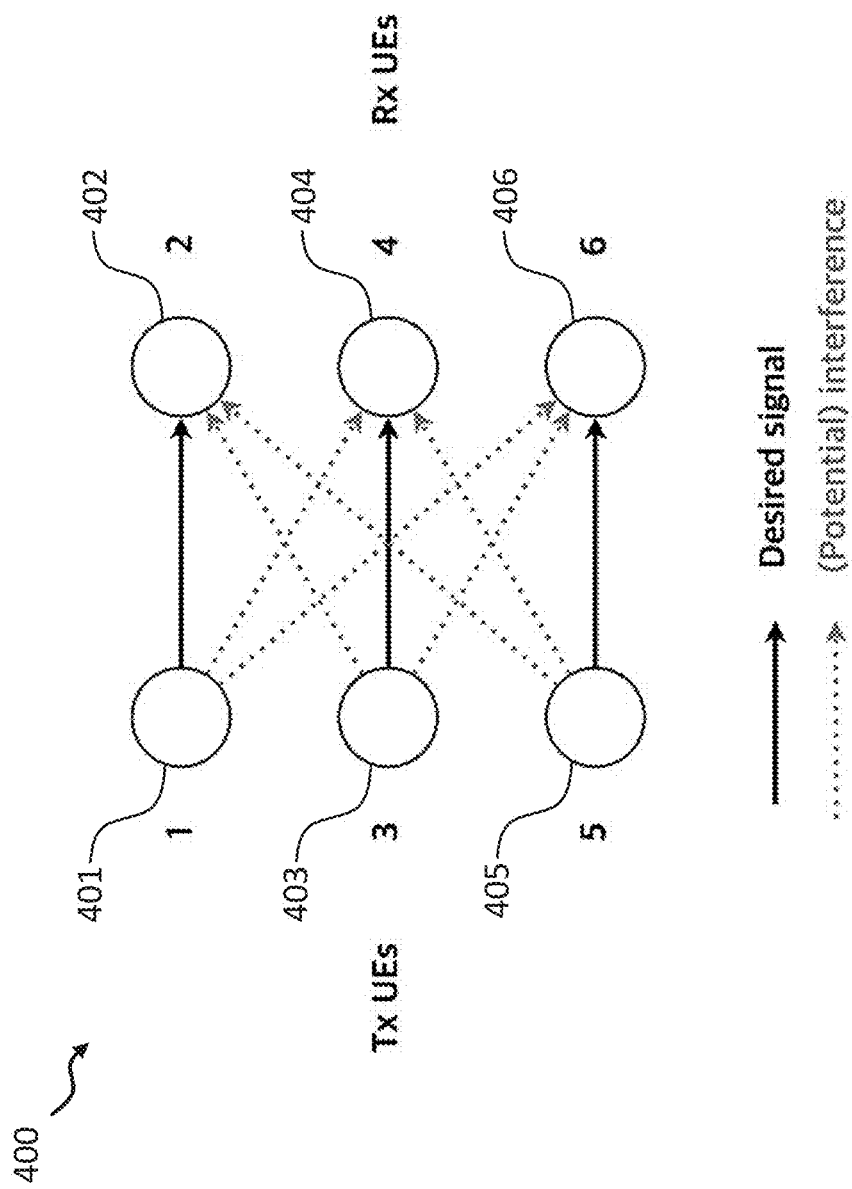
FIG. 4 shows a schematic diagram illustrating an exemplary communication network according to an embodiment.

FIG. 4 illustrates an exemplary communication network 400 comprising three links (transmitter/receiver pairs), wherein the communication network 400 comprises three vehicles 401, 403, 405 as transmitters and three vehicles 402, 404, 406 as receivers and wherein each vehicle comprises three antennas.

The nulling sets between these vehicles are provided as follows:
$Z_{12}=\{4\}$ $Z_{21}=\{5\}$
$Z_{34}=\{2,6\}$ $Z_{43}=\{\ \}$
$Z_{56}=\{4\}$ $Z_{65}=\{\ \}$ In this case, the same radio resource can be allocated to links (1,2) and (3,4), or to links (3,4) and (5,6), but not to links (1,2) and (5,6), since the vehicle (1) 401 is unable to null the vehicle (6) 406 and vice versa.

Figure 5:
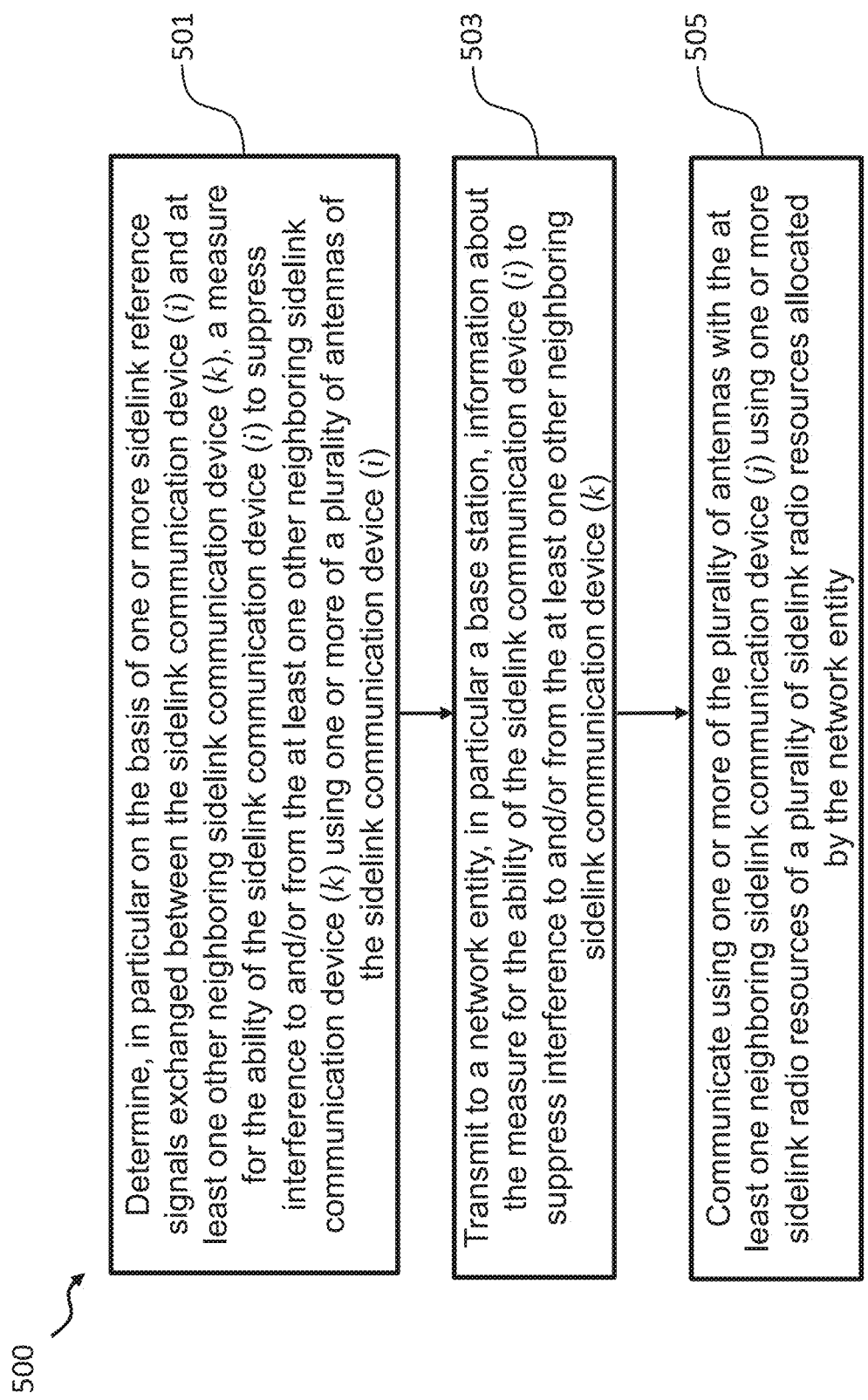
FIG. 5 shows a diagram illustrating a method for operating a sidelink communication device according to an embodiment.

FIG. 5 shows a diagram illustrating a corresponding method 500 for operating a sidelink communication device (i) 101, according to an embodiment, which is configured to communicate with at least one neighboring sidelink communication device (j).

The method 500 comprises the following steps: determining 501, in particular on the basis of one or more sidelink reference signals exchanged between the sidelink communication device (i) 101 and at least one other neighboring sidelink communication device (k), a measure for the ability of the sidelink communication device (i) 101 to suppress interference to and/or from the at least one other neighboring sidelink communication device (k) using one or more of a plurality of antennas of the sidelink communication device (i) 101; transmitting 503 to a network entity 131, in particular a base station, information about the measure for the ability of the sidelink communication device (i) 101 to suppress interference to and/or from the at least one other neighboring sidelink communication device (k); and communicating 505 using one or more of the plurality of antennas with the at least one neighboring sidelink communication device (j) using one or more sidelink radio resources of a plurality of sidelink radio resources allocated by the network entity 131.

Figure 6:
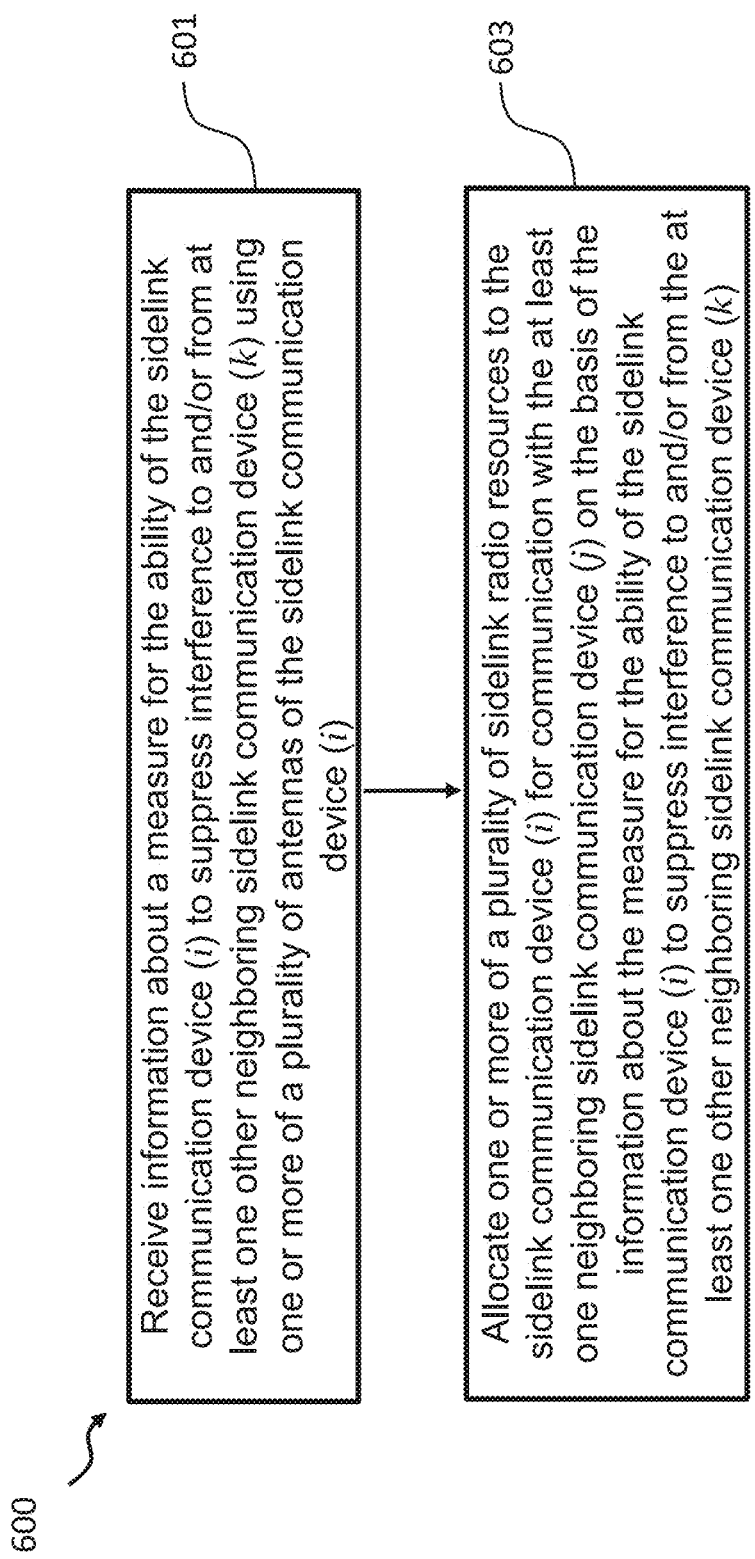
FIG. 6 shows a diagram illustrating a method for allocating sidelink resources for sidelink communication according to an embodiment.

FIG. 6 shows a diagram illustrating a corresponding method 600 for allocating sidelink radio resources for sidelink communication between a sidelink communication device (i) 101 and at least one neighboring sidelink communication device (j).

The method 600 comprises the following steps: receiving 601 information about a measure for the ability of the sidelink communication device (i) 101 to suppress interference to and/or from at least one other neighboring sidelink communication device (k) using one or more of a plurality of antennas of the sidelink communication device (i) 101; and allocating 603 one or more of a plurality of sidelink radio resources to the sidelink communication device (i) 101 for communication with the at least one neighboring sidelink communication device (j) on the basis of the information about the measure for the ability of the sidelink communication device (i) 101 to suppress interference to and/or from the at least one other neighboring sidelink communication device (k).

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present disclosure has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A sidelink communication device comprising:
   a transceiver comprising a plurality of antennas, wherein the transceiver is configured to communicate, using two or more of the plurality of antennas, with at least one neighboring sidelink communication device using one or more sidelink radio resources of a plurality of sidelink radio resources allocated by a network entity;
a processor configured to
determine an ability of the sidelink communication device to suppress interference based on one or more physical properties of a sidelink communication channel between the sidelink communication device and the at least one neighboring sidelink communication device,
wherein the determination is based on one or more physical properties of the sidelink communication channel between at least two of the plurality of antennas of the sidelink communication device and at least two of a plurality of antennas of the at least one neighboring sidelink communication device, and
wherein the one or more physical properties of the sidelink communication channel are based on one or more sidelink reference signals exchanged between the sidelink communication device and the at least one neighboring sidelink communication device; and
wherein the transceiver is further configured to transmit, to the network entity, information about the ability of the sidelink communication device to suppress the interference for use in allocating the one or more sidelink radio resources by the network entity.

2. The sidelink communication device of claim 1, wherein the transceiver is further configured to transmit, to the network entity, information about at least one of an identity, a signal strength, or a location of the at least one neighboring sidelink communication device.

3. The sidelink communication device of claim 1, wherein the transceiver is further configured to receive, from the network entity, at least one of information about the one or more sidelink reference signals or information about one or more sidelink radio resources for exchanging the one or more sidelink reference signals with the at least one neighboring sidelink communication device.

4. The sidelink communication device of claim 3, wherein the transceiver is further configured to transmit to or receive from the at least one neighboring sidelink communication device, on the basis of the information received from the network entity, the one or more sidelink reference signals.

5. The sidelink communication device of claim 1, wherein the transceiver is further configured to receive, from the network entity, radio resource allocation information specifying one or more of the plurality of sidelink radio resources allocated by the network entity for communicating with the at least one neighboring sidelink communication device, based on the information about the ability of the sidelink communication device to suppress the interference.

6. A method for operating a sidelink communication device configured to communicate with at least one neighboring sidelink communication device, the method comprising:
determining, based on one or more sidelink reference signals exchanged between the sidelink communication device and at least one other neighboring sidelink communication device, an ability of the sidelink communication device to suppress interference in a sidelink communication channel between at least two of the plurality of antennas of the sidelink communication device and at least two of a plurality of antennas of the at least one neighboring sidelink communication device,
wherein the interference is based on one or more physical properties of the sidelink communication channel, and
wherein the one or more physical properties are based on the one or more sidelink reference signals;
transmitting, to a network entity, information about the ability of the sidelink communication device to suppress the interference; and
communicating, using two or more of the plurality of antennas, with the at least one neighboring sidelink communication device using one or more sidelink radio resources of a plurality of sidelink radio resources allocated by the network entity.

7. A non-transitory computer-readable storage medium having stored thereon program code configured to, when executed by a computer or a processor, perform the method of claim 6.

8. The method for operating a sidelink communication device of claim 6, further including transmitting, to the network entity, information about at least one of an identity, a signal strength, or a location of the at least one neighboring sidelink communication device.

9. The method for operating a sidelink communication device of claim 6, further including receiving, from the network entity, at least one of information about the one or more sidelink reference signals or information about one or more sidelink radio resources for exchanging the one or more sidelink reference signals with the at least one neighboring sidelink communication device.

10. The method for operating a sidelink communication device of claim 9, further including transmitting to, or receive from, the at least one neighboring sidelink communication device, on the basis of the information received from the network entity, the one or more sidelink reference signals.

11. The method for operating a sidelink communication device of claim 6, further including receiving, from the network entity, radio resource allocation information specifying one or more of the plurality of sidelink radio resources allocated by the network entity for communicating with the at least one neighboring sidelink communication device, based on the information about the ability of the sidelink communication device to suppress the interference.

12. A network entity for allocating sidelink radio resources for sidelink communication between a sidelink communication device and at least one neighboring sidelink communication device, the network entity comprising:
a transceiver configured to receive information about an ability of the sidelink communication device to suppress interference of a sidelink communication channel between at least two of a plurality of antennas of the sidelink communication device and at least two of a plurality of antennas of the at least one neighboring sidelink communication device,
wherein the ability is based on one or more physical properties of a sidelink communication channel, and
wherein the one or more physical properties of the sidelink communication channel are based on one or more sidelink reference signals exchanged between the sidelink communication device and the at least one neighboring sidelink communication device; and
a processor configured to allocate one or more of a plurality of sidelink radio resources to the sidelink communication device for communication with the at least one neighboring sidelink communication device based on the information about the ability of the sidelink communication device to suppress the interference.

13. The network entity of claim 12, wherein the transceiver is further configured to receive information about at least one of an identity, a signal strength, and a location of the at least one neighboring sidelink communication device.

14. The network entity of claim 13, wherein the processor is further configured to determine the one or more sidelink reference signals or allocate one or more sidelink radio resources for exchanging the one or more sidelink reference signals based on at least one of the identity, the signal strength, or the location of the at least one neighboring sidelink communication device, and
wherein the transceiver is further configured to transmit, to the sidelink communication device, at least one of information about the one or more sidelink reference signals or information about the one or more sidelink radio resources for exchanging the one or more sidelink reference signals with the at least one neighboring sidelink communication device.

15. The network entity of claim 12, wherein the transceiver is further configured to transmit sidelink radio resource allocation information to the sidelink communication device,
wherein the sidelink radio resource allocation information identifies the one or more of the plurality of sidelink radio resources allocated to the sidelink communication device.

16. A method for allocating sidelink radio resources for sidelink communication between a sidelink communication device and at least one neighboring sidelink communication device, the method comprising:
receiving information about an ability of the sidelink communication device to suppress interference in a sidelink communication channel between the sidelink communication device and the at least one neighboring sidelink communication device,
wherein the sidelink communication channel uses two or more of a plurality of antennas in each of the sidelink communication device and the at least one neighboring sidelink communication device,
wherein the ability of the sidelink communication device to suppress interference is based on one or more physical properties of the sidelink communication channel, and
wherein the one or more physical properties are based on one or more sidelink reference signals exchanged between the sidelink communication device and the at least one neighboring sidelink communication device; and
allocating one or more of a plurality of sidelink radio resources to the sidelink communication device for communication with the at least one neighboring sidelink communication device based on the information about the ability of the sidelink communication device to suppress the interference.

17. A non-transitory computer-readable storage medium having stored thereon program code configured to, when executed by a computer or a processor, perform the method of claim 16.

18. The method for allocating sidelink radio resources for sidelink communication between the sidelink communication device and the at least one neighboring sidelink communication device of claim 16, further including receiving information about at least one of an identity, a signal strength, and a location of the at least one neighboring sidelink communication device.

19. The method for allocating sidelink radio resources for sidelink communication between the sidelink communication device and the at least one neighboring sidelink communication device of claim 18, further including:
determining the one or more sidelink reference signals or allocate one or more sidelink radio resources for exchanging the one or more sidelink reference signals based on at least one of the identity, the signal strength, or the location of the at least one neighboring sidelink communication device; and
transmitting, to the sidelink communication device, at least one of information about the one or more sidelink reference signals or information about the one or more sidelink radio resources for exchanging the one or more sidelink reference signals with the at least one neighboring sidelink communication device.

20. The method for allocating sidelink radio resources for sidelink communication between the sidelink communication device and the at least one neighboring sidelink communication device of claim 16, further including:
transmitting sidelink radio resource allocation information to the sidelink communication device, wherein the radio resource allocation information identifies the one or more of the plurality of sidelink radio resources allocated to the sidelink communication device.

* * * * *